(12) United States Patent
Qiu et al.

(10) Patent No.: US 8,734,011 B2
(45) Date of Patent: May 27, 2014

(54) DISTRIBUTED OPTICAL FIBER TEMPERATURE SENSOR BASED ON OPTICAL FIBER DELAY

(75) Inventors: Qi Qiu, Chengdu (CN); Jun Su, Chengdu (CN); Shuangjin Shi, Chengdu (CN); Yun Liao, Chengdu (CN); Caidong Xiong, Chengdu (CN)

(73) Assignee: University of Electronic Science and Technology of China, Chengdu, Sichuan Province (CN)

( * ) Notice: Subject to any disclaimer, the term of this patent is extended or adjusted under 35 U.S.C. 154(b) by 66 days.

(21) Appl. No.: 13/464,991

(22) Filed: May 6, 2012

(65) Prior Publication Data

US 2013/0148691 A1     Jun. 13, 2013

(30) Foreign Application Priority Data

Dec. 7, 2011  (CN) .......................... 2011 1 0402538

(51) Int. Cl.
*G01K 11/00* (2006.01)
*G02B 6/00* (2006.01)

(52) U.S. Cl.
USPC ...................... 374/161; 374/E11.015; 385/12

(58) Field of Classification Search
CPC ................................. G01K 11/32; G01K 1/02
USPC .................. 374/161, 10, 30; 385/12
See application file for complete search history.

(56) References Cited

U.S. PATENT DOCUMENTS

| | | | | |
|---|---|---|---|---|
| 6,381,069 | B1 * | 4/2002 | Riant et al. | 359/569 |
| 6,591,025 | B1 * | 7/2003 | Siems et al. | 385/12 |
| 6,633,695 | B2 * | 10/2003 | Bailey et al. | 385/24 |
| 6,785,004 | B2 * | 8/2004 | Kersey et al. | 356/478 |
| 6,885,257 | B2 * | 4/2005 | Kroening | 333/1.1 |
| 7,127,132 | B1 * | 10/2006 | Moslehi et al. | 385/12 |
| 7,206,509 | B2 * | 4/2007 | Beacken | 398/53 |
| 7,283,216 | B1 * | 10/2007 | Geng et al. | 356/35.5 |
| 7,580,184 | B2 * | 8/2009 | Shu et al. | 359/337.5 |
| 2003/0138197 | A1 * | 7/2003 | Wakabayashi et al. | 385/27 |
| 2004/0196158 | A1 * | 10/2004 | Sugaya et al. | 340/815.4 |
| 2005/0117830 | A1 * | 6/2005 | Hartog et al. | 385/12 |
| 2008/0068586 | A1 * | 3/2008 | Kishida et al. | 356/32 |
| 2009/0140879 | A1 * | 6/2009 | Kamata et al. | 340/853.2 |

* cited by examiner

*Primary Examiner* — Lisa Caputo
*Assistant Examiner* — Nasir U Ahmed

(57) ABSTRACT

The present invention discloses distributed optical fiber temperature sensor based on optical fiber delay technology, including a tunable optical transmitter module, an optical receiver module, a signal processing and controlling module and multiple distributed sensing modules connected in series via transmission fibers. The multiple wavelengths optical signals transmitted from the tunable optical transmitter module respectively are transmitted into the first sensing module, and then transmitted out from the last sensing module. The output multiple wavelengths optical signals arrive at the optical receiver module. The optical receiver module converts optical signals of all wavelengths into electrical signals and transmits them into the signal processing and controlling module. The signal processing and controlling module measures transmission delay time of optical signal of each wavelength respectively, and calculates and obtains the temperature parameters of corresponding distributed testing positions based on the relative delay time.

9 Claims, 2 Drawing Sheets

DISTRIBUTED OPTICAL FIBER TEMPERATURE SENSOR BASED ON OPTICAL FIBER DELAY

BACKGROUND OF THE PRESENT INVENTION

1. Field of Invention

The present invention relates to optical fiber temperature sensing technology, more particularly to distributed optical fiber temperature sensor based on optical fiber delay technology.

2. Description of Related Arts

Distributed optical fiber temperature sensor is safe, light, accurate, and can resist electromagnetic interference, so that it has been widely applied to the temperature measurement systems of generating equipment, power transformer equipment, bridge, dam and tunnel to detect the temperature variation of different positions along the optical fiber transmission path.

Distributed optical fiber temperature sensing technology is usually divided into two categories. The first category of distributed optical fiber temperature sensor distributes optical fiber gratings along the optical fiber transmission path and connects them in series so as to form a distributed optical fiber grating structure. The constant of optical fiber grating changes with temperature variation, and the spectral characteristic of transmitted light and reflected light of the optical fiber grating also changes. Therefore, via detecting the spectral variation of transmitted light and reflected light of the optical fiber grating of different positions, the corresponding temperature parameters of the optical fiber grating of different positions can be obtained. The second category utilizes non-linear Brillouin backward scattering produced by laser in optical fiber, and determine the temperature variation and its position according to the spectral variation of Brillouin backward scattering and the position of backward scattering, so as to obtain the accurate measurement of the temperature and distance, which is called Brillouin Optical Time Domain Reflectometer (BOTDR).

Both of the above categories transform temperature measurement to the spectral measurement. However, in photoelectric detecting technique, accurate spectral measurement requires complex measurement equipment and system, which costs high and cannot widely spread. Furthermore, the optical fiber grating cannot measure high temperature, and the non-linear Brillouin backward scattering is also restricted by high temperature.

SUMMARY OF THE PRESENT INVENTION

In order to solve the above technical problems, the present invention provides an optical fiber temperature sensor based on optical fiber delay technology, which can lower the cost of the optical fiber temperature sensor and enlarge the measurable temperature range. The present invention further provides a topological structure, where temperatures are measured respectively in different delay by using multiple wavelength optical signals, so that the function of distributed optical fiber temperature sensor is realized.

The operating principle is explained as follows. There is a delay when optical signal transmitting in the optical fiber. The delay time is in direct proportion to the length and refractive index of fiber. Study shows that the refractive index of silica ($SiO_2$) fiber increases with temperature, so that temperature variation will cause additional transmission delay of optical signal transmitting in optical fiber. Therefore, by measuring the additional transmission delay of optical signal, the temperature variation can be obtained.

The distributed optical fiber temperature sensor based on optical fiber delay adopts tunable laser or laser with multiple wavelengths as light source. Each wavelength corresponds to a sensing module at a different testing position. By measuring the additional transmission delay of optical signal of every wavelength, the temperature parameter of every position can be obtained.

Based on the above operating principle, referring to FIG. 1, the present invention is embodied as below.

The present invention provides distributed optical fiber temperature sensor based on optical fiber delay technology, characterized in that, it includes a tunable optical transmitter module, an optical receiver module, a signal processing and controlling module and multiple distributed sensing modules connected in series via transmission fibers. The multiple wavelengths optical signals transmitted from the tunable optical transmitter module respectively are transmitted into the first sensing module via a transmission fiber, and then transmitted out from the last sensing module. The output multiple wavelengths optical signals are transmitted into the optical receiver module via another transmission fiber. The optical receiver module converts optical signals of all wavelengths into electrical signals and transmits them into the signal processing and controlling module. The signal processing and controlling module measures transmission delay time of optical signal of each wavelength respectively, and calculates and obtains the temperature parameters of corresponding distributed testing positions respectively based on the relative delay time.

The sensing module includes transmission fibers, a sensing fiber, optical circulators and a wavelength selecting unit. Different wavelength selecting units can be deployed according to the circumstance.

The operating process of the sensing module is illustrated as follows. The multiple wavelengths optical signals arrive at the first optical circulator, pass through from port 1 ① to port 2 ② of the first optical circulator, and then arrive at the wavelength selecting unit. The optical signal with a certain wavelength that is same with reflection wavelength of the wavelength selecting unit is reflected back to the port 2 ② of the first optical circulator. The reflected optical signal is output from port 3 ③ of the first optical circulator, and enters into the sensing fiber via transmission fiber, so that the optical signal with additional delay caused by temperature variation is obtained. The optical signal is then transmitted to port 1 ① of the second optical circulator of the sensing module via transmission fiber, is output from port 2 ② of the second optical circulator, arrives at the wavelength selecting unit, then is reflected back to the port 2 ② of the second optical circulator, is output from port 3 ③ of the second optical circulator, and is sent to the next distributed sensing module via transmission fiber. The optical signals of other wavelengths arrive at port 2 ② of the second optical circulator directly through the wavelength selecting unit, then is output from port 3 ③ of the second optical circulator, and is sent to the next distributed sensing module via transmission fiber.

The tunable optical transmitter module adopts tunable semiconductor laser unit or semiconductor laser array with multiple wavelengths to send continuous sine waves or pulse optical signals with multiple wavelengths through direct intensity modulation or indirect intensity modulation.

The optical receiver module adopts PIN or APD photoelectric detector to detect the optical signal sent by the transmission fiber, convert the optical signal to the electrical signal and send it to the signal processing and controlling module.

The optical circulator adopts three-port optical fiber circulator or a three-port optical circulator constructed by optical elements to realize the optical path function.

The wavelength selection unit is a device that can reflect an optical signal with certain wavelength and allow transmission of optical signals with other wavelengths, such as fiber bragg grating, interference filter and so on.

The transmission fiber is silica ($SiO_2$) multimode fiber or single mode fiber, or plastic fiber.

The sensing fiber is silica ($SiO_2$) multimode fiber or single mode fiber. When the sensing temperature is above the operating temperature range of the coating of the optical fiber, remove the coating of the sensing fiber.

Compared to the prior art, the beneficial effect of the present invention is explained as below. I. One wavelength corresponds to one distributed testing position, so that a plurality of distributed nodes can be measured by taking advantage of the broadband of optical fiber. II. Sensing fiber adopts silica ($SiO_2$) fiber, so that temperature range that can be measured is enlarged. III. The operating theory of the present invention is to sense the temperature by measuring time delay, so that the distributed optical fiber temperature sensor based on this theory is simple in structure, low in cost and easy to spread.

These and other objectives, features, and advantages of the present invention will become apparent from the following detailed description, the accompanying drawings, and the appended claims.

DETAILED DESCRIPTION OF THE PREFERRED EMBODIMENT

The present invention will be further illustrated with the drawings and preferred embodiment as follows.

The present invention provides distributed optical fiber temperature sensor based on optical fiber delay technology, characterized in that, it includes a tunable optical transmitter module, an optical receiver module, a signal processing and controlling module and multiple distributed sensing modules connected in series via transmission fibers. The multiple wavelengths optical signals transmitted from the tunable optical transmitter module respectively are transmitted into the first sensing module via a transmission fiber, and then transmitted out from the last sensing module. The output multiple wavelengths optical signals are transmitted into the optical receiver module via another transmission fiber. The optical receiver module converts optical signals of all wavelengths into electrical signals and transmits them into the signal processing and controlling module. The signal processing and controlling module measures transmission delay time of optical signal of each wavelength respectively, and calculates and obtains the temperature parameters of corresponding distributed testing positions respectively based on the relative delay time.

Figure 1:
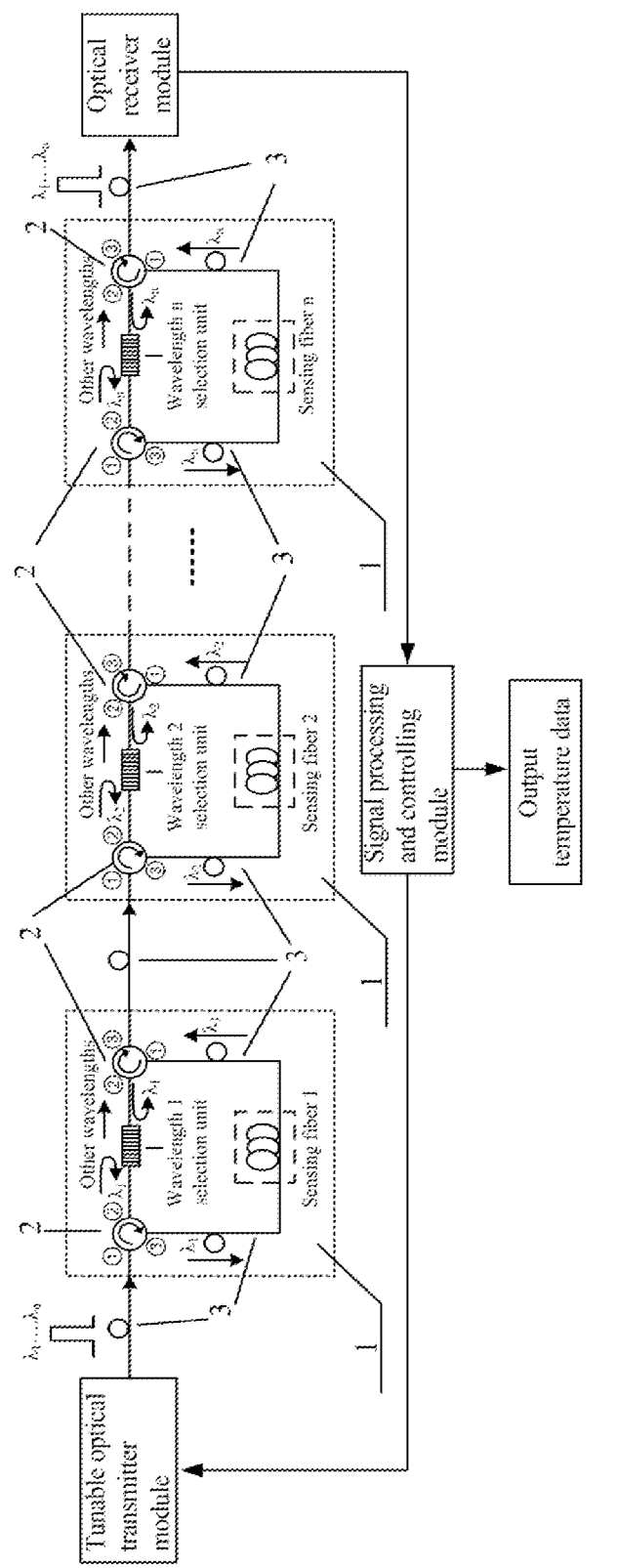
FIG. 1 is a structural block diagram of the present invention, wherein 1: sensing module, 2: optical circulator, 3: transmission optical fiber.
Figure 2:
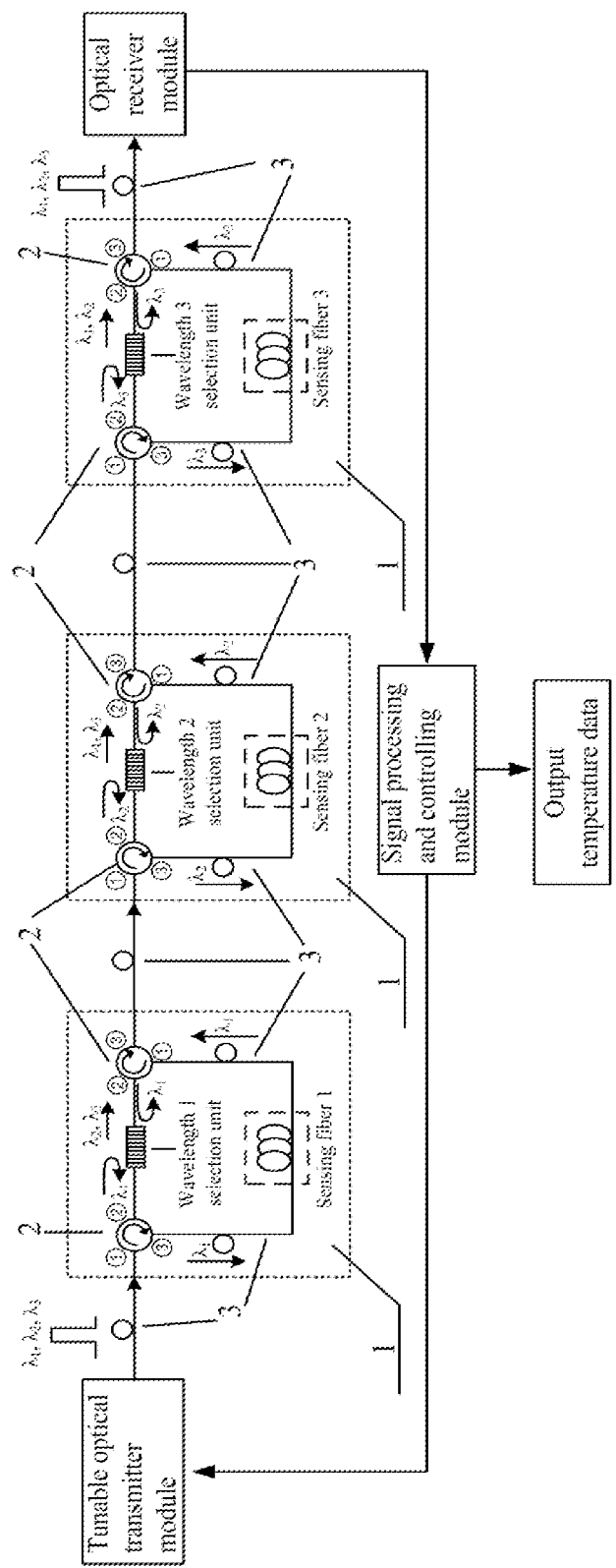
FIG. 2 is a structural block diagram of a preferred embodiment of the present invention, wherein 1: sensing module, 2: optical circulator, 3: transmission optical fiber.

The preferred embodiment is shown as FIG. 2.

The tunable optical transmitter module adopts tunable semiconductor laser unit as light source and transmits pulse optical signals of three wavelengths by employing external modulation. The three operating wavelengths are 1550.12 nm, 1550.92 nm and 1551.72 nm respectively. The optical receiver module includes a PIN photoelectric detector with 1550 nm wave band, a preamplifier and a main amplifier.

Three sensing modules are used in the preferred embodiment. The optical circulator in the sensing module adopts three-port optical fiber circulator of 1550 nm wave band. The wavelength selecting units of three sensing modules adopts FBG (fiber bragg grating) corresponding to 1550.12 nm, 1550.92 nm, and 1551.72 nm wavelengths respectively. The transmission fiber uses G.652 single mode fiber, and its length is determined according to the distributed position. The sensing fiber 1, sensing fiber 2 and sensing fiber 3 are all G.652 single mode fiber of 1000 m with coating removed. The signal processing and controlling module adopts high precision analog and digital circuit to produce and control transmission signal, measure transmission delay of optical signal with different wavelengths, and calculate the corresponding delay time to obtain the temperature parameters of testing positions corresponding to every wavelength.

The operating process is illustrated as follows. Controlled by the signal processing and controlling module, the tunable semiconductor laser unit transmits pulse optical signals with three wavelengths 1550.12 nm, 1550.92 nm and 1551.72 nm respectively. The first, second and third distributed testing positions all have a sensing module respectively. The optical signal with the first wavelength arrives at the first optical circulator of the sensing module of the first distributed position via transmission fiber, passes through from port 1 ① to port 2 ② of the first optical circulator, and then arrives at the first wavelength selecting unit. The wavelength of the optical signal with the first wavelength is same with the reflection wavelength of the first wavelength selecting unit, so that the optical signal of the first wavelength is reflected back to the port 2 ② of the first optical circulator. The reflected optical signal is output from port 3 ③ of the first optical circulator, and enters into the sensing fiber via transmission fiber, so that the optical signal with additional delay caused by temperature variation is obtained. The delayed optical signal is transmitted to port 1 ① of the second optical circulator of the sensing module of the first distributed testing position via transmission fiber, is output from port 2 ② of the second optical circulator, arrives at the first wavelength selecting unit, then is reflected back to the port 2 ② of the second optical circulator, is output from port 3 ③ of the second optical circulator, and is sent to the second distributed testing position via transmission fiber. The optical signals of other wavelengths arrive at port 2 ② of the second optical circulator directly through the first wavelength selecting unit, then is output from port 3 ③ of the second optical circulator, and is sent to the second distributed testing position via transmission fiber.

Likewise, the optical signal of the second wavelength arrives at the first optical circulator of the sensing module of the second distributed testing position via transmission fiber, passes through from port 1 ① to port 2 ② of the first optical circulator, and then arrives at the second wavelength selecting unit. The wavelength of the optical signal with the second wavelength is same with the reflection wavelength of the second wavelength selecting unit, so that the optical signal of the second wavelength is reflected back to the port 2 ② of the first optical circulator. The reflected optical signal is output from port 3 ③ of the first optical circulator, and enters into the second sensing fiber via transmission fiber, so that the optical signal with additional delay caused by temperature variation is obtained. The delayed optical signal is transmitted to port 1 ① of the second optical circulator of the sensing module of the second distributed testing position via transmission fiber, is output from port 2 ②  of the second optical circulator, arrives at the second wavelength selecting unit, then is reflected back to the port 2 ② of the second optical circulator, is output from port 3 ③ of the second optical circulator, and is sent to the third distributed testing position via transmission fiber. The optical signals of other wavelengths arrive at port 2 ② of the second optical circulator directly through the second wavelength selecting unit, then is output from port 3 ③ of the second optical circulator, and is sent to the third distributed testing position via transmission fiber.

On the analogy of this, the optical signal of the third wavelength arrives at the first optical circulator of the sensing module of the third distributed testing position via transmission fiber, passes through from port 1 ① to port 2 ② of the first optical circulator, and then arrives at the third wavelength selecting unit. The wavelength of the optical signal with the third wavelength is same with the reflection wavelength of the third wavelength selecting unit, so that the optical signal of the third wavelength is reflected back to the port 2 ② of the first optical circulator. The reflected optical signal is output from port 3 ③ of the first optical circulator, and enters into the third sensing fiber via transmission fiber, so that the optical signal with additional delay caused by temperature variation is obtained. The delayed optical signal is transmitted to port 1 ① of the second optical circulator of the sensing module of the third distributed testing position via transmission fiber, is output from port 2 ② of the second optical circulator, arrives at the third selecting unit, then is reflected back to the port 2 ② of the second optical circulator, is output from port 3 ③ of the second optical circulator, and is sent to the optical receiver module via transmission fiber. The optical signals of other wavelengths arrive at port 2 ② of the second optical circulator directly through the third wavelength selecting unit, then is output from port 3 ③ of the second optical circulator, and is sent to the optical receiver module via transmission fiber.

The optical signals with 3 wavelengths pass through 3 distributed testing positions respectively, and then different additional delay times caused by temperature variation are obtained. The optical signals are sent to the optical receiver module at last. The optical receiver module converts the optical signals into the electrical signals and sends them into the signal processing and controlling module. The signal processing and controlling module measures the transmission delay times of optical signal with 3 wavelengths respectively, and calculates and obtains the temperature parameters of 3 distributed testing positions corresponding to 3 wavelengths.

In the present invention, the number of the sensing modules is same with the number of the distributed testing positions, but not limited to 3 sensing modules as illustrated in the preferred embodiment.

The temperature sensor based on the above principle falls into the protection scope of the present invention.

What is claimed is:

1. A distributed optical fiber temperature sensor based on optical fiber delay, comprising a tunable optical transmitter module, an optical receiver module, a signal processing and controlling module and multiple distributed sensing modules connected in series via transmission fibers, wherein multiple wavelengths optical signals transmitted from the tunable optical transmitter module respectively are transmitted into a first sensing module via a transmission fiber, and then transmitted out from a last sensing module; the output multiple wavelengths optical signals are transmitted into the optical receiver module via another transmission fiber; the optical receiver module converts optical signals of all wavelengths into electrical signals and transmits them into the signal processing and controlling module; the signal processing and controlling module measures transmission delay time of optical signal of each wavelength respectively, and calculates and obtains the temperature parameters of corresponding distributed testing positions based on the relative delay time, wherein the sensing module comprises a first optical circulator, a second optical circulator, transmission fibers, a sensing fiber and a wavelength selecting unit, wherein the multiple wavelengths optical signals arrive at the first optical circulator, pass through from port 1 to port 2 of the optical circulator, and then arrive at the wavelength selecting unit; the optical signal with a certain wavelength that is same with reflection wavelength of the wavelength selecting unit is reflected back to the port 2 of the first optical circulator; the reflected optical signal is output from port 3 of the first optical circulator, and enters into the sensing fiber via transmission fiber, so that the optical signal with additional delay caused by temperature variation is obtained; the optical signal is then transmitted to port 1 of the second optical circulator of the sensing module via transmission fiber, is output from port 2 of the second optical circulator, arrives at the wavelength selecting unit, then is reflected back to the port 2 of the second optical circulator, is output from port 3 of the second optical circulator, and is sent to the next sensing module via transmission fiber; the optical signals of other wavelengths arrive at port 2 of the second optical circulator directly through the wavelength selecting unit, then are output from port 3 of the second optical circulator, and are sent to the next sensing module via transmission fiber.

2. The distributed optical fiber temperature sensor based on optical fiber delay, as recited in claim 1, the tunable optical transmitter module adopts tunable semiconductor laser unit or semiconductor laser array with multiple wavelengths to send continuous sine waves or pulse optical signals with multiple wavelengths through direct intensity modulation or indirect intensity modulation.

3. The distributed optical fiber temperature sensor based on optical fiber delay, as recited in claim 1, the optical receiver module adopts PIN or APD photoelectric detector to detect optical signal sent by the transmission fiber, convert optical signal to electrical signal and send the electrical signal to the signal processing and controlling module.

4. The distributed optical fiber temperature sensor based on optical fiber delay, as recited in claim 1, the wavelength selection unit can reflect an optical signal with a predetermined wavelength and allow transmission of optical signals with other wavelengths.

5. The distributed optical fiber temperature sensor based on optical fiber delay, as recited in claim 1, the transmission fiber is silica ($SiO_2$) multimode fiber or single mode fiber, or plastic fiber.

6. The distributed optical fiber temperature sensor based on optical fiber delay, as recited in claim 1, the sensing fiber is silica ($SiO_2$) multimode fiber or single mode fiber, wherein when sensing temperature is above operating temperature range of coating of optical fiber, the coating of the sensing fiber is removed.

7. The distributed optical fiber temperature sensor based on optical fiber delay, as recited in claim 1, wherein the tunable optical transmitter module adopts tunable semiconductor laser unit as light source and transmits pulse optical signals of three wavelengths by employing external modulation, the three operating wavelengths are 1550.12 nm, 1550.92 nm and 1551.72 nm respectively, the optical receiver module includes a PIN photoelectric detector with 1550 nm wave band, a preamplifier and a main amplifier, wherein three sensing modules are used, the optical circulator in the sensing module adopts three-port optical fiber circulator of 1550 nm wave band, the wavelength selecting units of three sensing modules adopts FBG (fiber bragg grating) corresponding to 1550.12 nm, 1550.92 nm, and 1551.72 nm wavelengths respectively, the transmission fiber uses G.652 single mode fiber, and its length is determined according to the distributed position, the three sensing fibers are all G.652 single mode fiber of 1000 m with coating removed, the signal processing and controlling module adopts high precision analog and digital circuit to produce and control transmission signal, measure transmission delay of optical signal with different wavelengths, and calculate the corresponding delay time to obtain the temperature parameters of testing positions corresponding to every wavelength.

8. The distributed optical fiber temperature sensor based on optical fiber delay, comprising a tunable optical transmitter module, an optical receiver module, a signal processing and controlling module and multiple distributed sensing modules connected in series via transmission fibers, wherein multiple wavelengths optical signals transmitted from the tunable optical transmitter module respectively are transmitted into a first sensing module via a transmission fiber, and then transmitted out from a last sensing module; the output multiple wavelengths optical signals are transmitted into the optical receiver module via another transmission fiber; the optical receiver module converts optical signals of all wavelengths into electrical signals and transmits them into the signal processing and controlling module; the signal processing and controlling module measures transmission delay time of optical signal of each wavelength respectively, and calculates and obtains the temperature parameters of corresponding distributed testing positions based on the relative delay time, wherein the sensing module comprises a first optical circulator, a second optical circulator, transmission fibers, a sensing fiber and a wavelength selecting unit, wherein the multiple wavelengths optical signals arrive at the first optical circulator, pass through from port 1 to port 2 of the optical circulator, and then arrive at the wavelength selecting unit; the optical signal with a certain wavelength that is same with reflection wavelength of the wavelength selecting unit is reflected back to the port 2 of the first optical circulator; the reflected optical signal is output from port 3 of the first optical circulator, and enters into the sensing fiber via transmission fiber, so that the optical signal with additional delay caused by temperature variation is obtained; the optical signal is then transmitted to port 1 of the second optical circulator of the sensing module via transmission fiber, is output from port 2 of the second optical circulator, arrives at the wavelength selecting unit, then is reflected back to the port 2 of the second optical circulator, is output from port 3 of the second optical circulator, and is sent to the next sensing module via transmission fiber; the optical signals of other wavelengths arrive at port 2 of the second optical circulator directly through the wavelength selecting unit, then are output from port 3 of the second optical circulator, and are sent to the next sensing module via transmission fiber, wherein the tunable optical transmitter module adopts tunable semiconductor laser unit or semiconductor laser array with multiple wavelengths to send continuous sine waves or pulse optical signals with multiple wavelengths through direct intensity modulation or indirect intensity modulation, wherein the optical receiver module adopts PIN or APD photoelectric detector to detect optical signal sent by the transmission fiber, convert optical signal to electrical signal and send the electrical signal to the signal processing and controlling module, wherein the wavelength selection unit can reflect an optical signal with a predetermined wavelength and allow transmission of optical signals with other wavelengths, wherein the transmission fiber is silica (SiO2) multimode fiber or single mode fiber, or plastic fiber, wherein the sensing fiber is silica (SiO2) multimode fiber or single mode fiber, wherein when sensing temperature is above operating temperature range of coating of optical fiber, the coating of the sensing fiber is removed.

9. The distributed optical fiber temperature sensor based on optical fiber delay, as recited in claim 8, wherein the tunable optical transmitter module adopts tunable semiconductor laser unit as light source and transmits pulse optical signals of three wavelengths by employing external modulation, the three operating wavelengths are 1550.12 nm, 1550.92 nm and 1551.72 nm respectively, the optical receiver module includes a PIN photoelectric detector with 1550 nm wave band, a preamplifier and a main amplifier, and wherein three sensing modules are used, the optical circulator in the sensing module adopts three-port optical fiber circulator of 1550 nm wave band, the wavelength selecting units of three sensing modules adopts FBG (fiber bragg grating) corresponding to 1550.12 nm, 1550.92 nm, and 1551.72 nm wavelengths respectively, the transmission fiber uses G.652 single mode fiber, and its length is determined according to the distributed position, the three sensing fibers are all G.652 single mode fiber of 1000 m with coating removed, the signal processing and controlling module adopts high precision analog and digital circuit to produce and control transmission signal, measure transmission delay of optical signal with different wavelengths, and calculate the corresponding delay time to obtain the temperature parameters of testing positions corresponding to every wavelength.

* * * * *